United States Patent
Muehlmann et al.

(10) Patent No.: US 10,741,069 B2
(45) Date of Patent: Aug. 11, 2020

(54) CONTROLLING A MOTOR VEHICLE

(71) Applicant: Robert Bosch GmbH, Stuttgart (DE)

(72) Inventors: Karsten Muehlmann, Stuttgart (DE); Achim Feyerabend, Heilbronn (DE); Dominik Maucher, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 102 days.

(21) Appl. No.: 16/090,428

(22) PCT Filed: Feb. 24, 2017

(86) PCT No.: PCT/EP2017/054340
§ 371 (c)(1),
(2) Date: Oct. 1, 2018

(87) PCT Pub. No.: WO2017/186378
PCT Pub. Date: Nov. 2, 2017

(65) Prior Publication Data
US 2019/0122550 A1     Apr. 25, 2019

(30) Foreign Application Priority Data

Apr. 27, 2016 (DE) .......................... 10 2016 207 125

(51) Int. Cl.
*G08G 1/0967* (2006.01)
*G06K 9/00* (2006.01)
(Continued)

(52) U.S. Cl.
CPC ........ *G08G 1/096725* (2013.01); *G01S 19/48* (2013.01); *G06K 9/00818* (2013.01);
(Continued)

(58) Field of Classification Search
CPC .. G06K 9/6277; G06K 9/3233; G06K 9/6267; G08G 1/096775; G08G 1/096741
See application file for complete search history.

(56) References Cited

U.S. PATENT DOCUMENTS 6,973,385 B2 * 12/2005 Ulrich .................. G06Q 10/025
340/572.1
7,398,076 B2 * 7/2008 Kubota .............. G01C 21/3602
455/344

(Continued)

FOREIGN PATENT DOCUMENTS

DE     102005052175 A1     5/2007
DE     102009057553 A1     6/2011
(Continued)

OTHER PUBLICATIONS

International Search Report for PCT/EP2017/054340, dated Jun. 16, 2017.

*Primary Examiner* — Yosef Kassa
(74) *Attorney, Agent, or Firm* — Norton Rose Fulbright US LLP; Gerard Messina

(57) ABSTRACT

A method for controlling a motor vehicle, including steps of scanning an object in the area of the motor vehicle; of determining a present specific embodiment of the object; of comparing the present specific embodiment with different predetermined specific embodiments of the object; of selecting a predetermined specific embodiment that corresponds to the present specific embodiment; and of determining the local area in which the motor vehicle is located on the basis of a local area that is associated with the selected specific embodiment.

12 Claims, 7 Drawing Sheets

(51) Int. Cl.
  *G08G 1/0962* (2006.01)
  *G01S 19/48* (2010.01)
  *G01C 21/36* (2006.01)

(52) U.S. Cl.
  CPC ..... *G08G 1/09623* (2013.01); *G01C 21/3602* (2013.01); *G06K 9/00798* (2013.01)

(56) References Cited

U.S. PATENT DOCUMENTS

| | | | | |
|---|---|---|---|---|
| 7,442,284 | B2* | 10/2008 | Ren | B82Y 10/00 |
| | | | | 204/294 |
| 7,782,227 | B2* | 8/2010 | Boss | G08G 1/162 |
| | | | | 340/902 |
| 7,957,559 | B2* | 6/2011 | Shima | G06K 9/00798 |
| | | | | 348/113 |
| 8,031,062 | B2* | 10/2011 | Smith | G08G 1/166 |
| | | | | 340/438 |
| 8,594,370 | B2* | 11/2013 | Schamp | B60R 21/0134 |
| | | | | 382/103 |
| 8,600,673 | B2* | 12/2013 | Nakamura | B60R 1/00 |
| | | | | 701/23 |
| 8,630,793 | B2* | 1/2014 | Takemura | B60W 30/12 |
| | | | | 701/301 |
| 8,762,021 | B2* | 6/2014 | Yoshihama | B60K 31/0075 |
| | | | | 701/70 |
| 8,836,812 | B2* | 9/2014 | Kanamoto | G06K 9/4647 |
| | | | | 348/218.1 |
| 8,855,900 | B2* | 10/2014 | Lection | G08G 1/0145 |
| | | | | 340/907 |
| 2006/0233424 | A1 | 10/2006 | Miyajima et al. | |
| 2013/0162824 | A1 | 6/2013 | Sung et al. | |

FOREIGN PATENT DOCUMENTS

| | | |
|---|---|---|
| DE | 102015201406 A1 | 8/2015 |
| EP | 1906374 A2 | 4/2008 |
| EP | 2116984 A1 | 11/2009 |

* cited by examiner

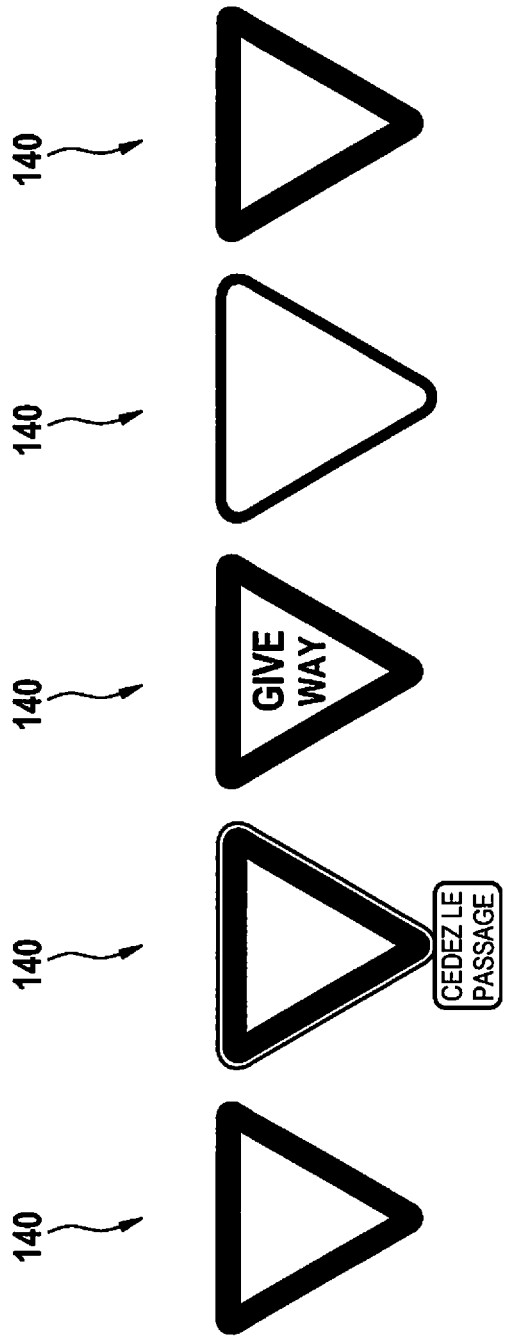

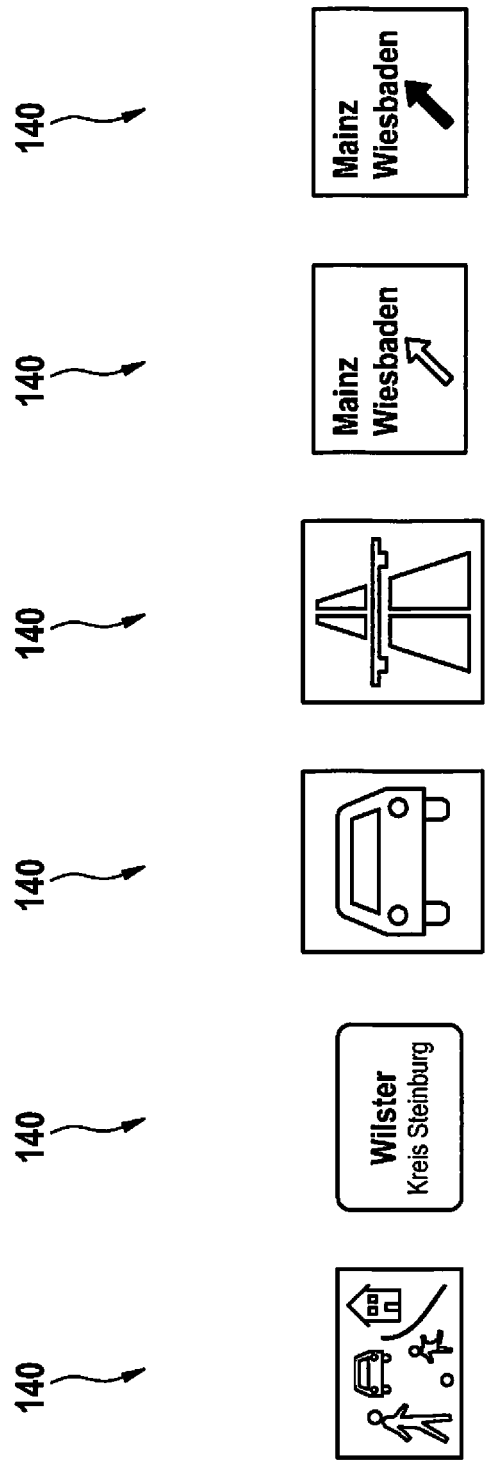

605  610

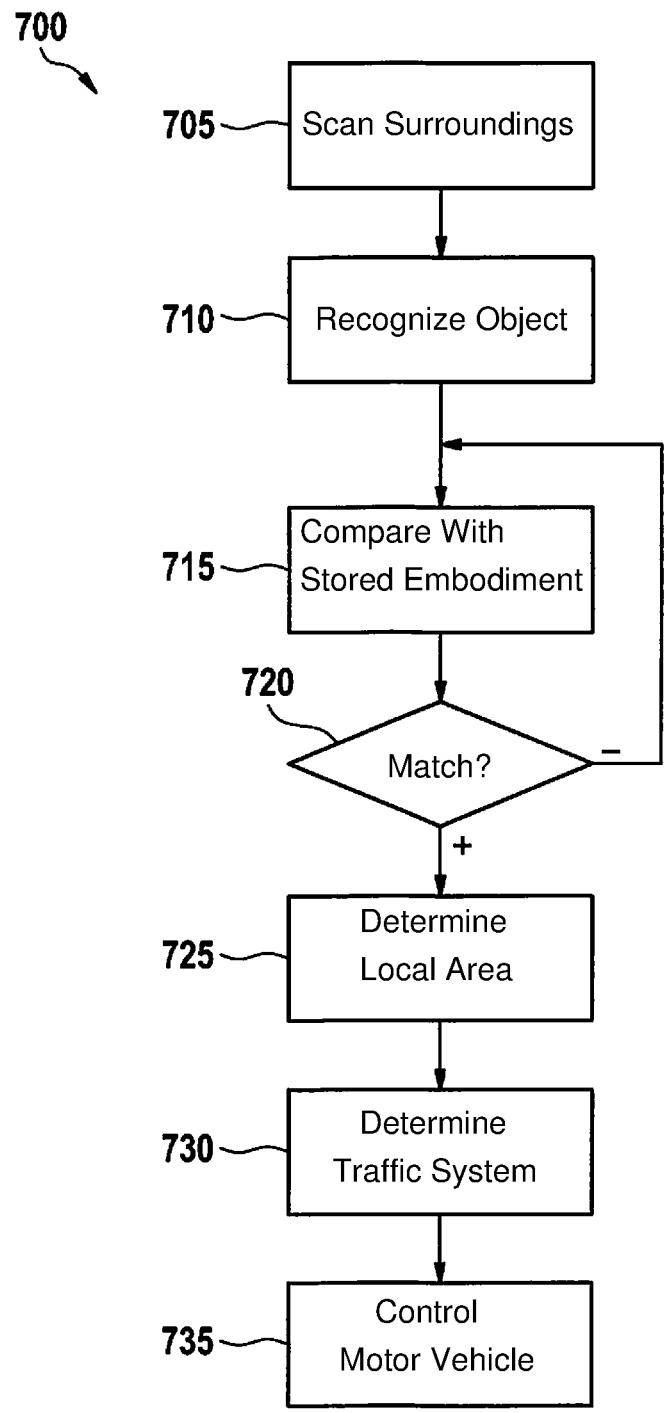

CONTROLLING A MOTOR VEHICLE

FIELD OF THE INVENTION

The present invention relates to the control of a motor vehicle. The present invention relates, in particular, to the control of the motor vehicle as a function of locally applicable requirements.

BACKGROUND INFORMATION

A motor vehicle is intended to be controlled in an automated manner on a road network. In such case, a so-called driver assistant may be used, which supports a specific function of the motor vehicle, or the motor vehicle may be controlled autonomously, i.e. controlled automatically without the input or without the monitoring of a driver. The automatic control may include, in particular, a longitudinal control or a lateral control.

Normally, a position of the motor vehicle is determined with the aid of a positioning system, such as of a receiver for satellite navigation (for example, GPS) and locally applicable requirements are determined based on the determined position. One such requirement may, for example, relate to the question whether right-hand traffic or left-hand traffic is prevalent in the prevailing traffic system. Another requirement may, for example, relate to a maximum allowed driving speed of the motor vehicle. For this purpose, it may be necessary to determine a road class of the road on which the motor vehicle is located.

If a position determination with the aid of the positioning device is not possible, for example, in a tunnel or in a street canyon, then the determination of locally applicable requirements for controlling the motor vehicle may be limited.

US 2013/0162824 A1 provides for the detection of an object in the area of the motor vehicle for determining the position of the object on a road map and thereafter determining the position of the motor vehicle.

US 2006/0233424 A1 relates to the determination of a position on the basis of road features whose positions are known.

SUMMARY

An object of the present invention is to specify an improved technology, with the aid of which a local area in which the motor vehicle is located may be determined.

A method includes steps of scanning an object in the area of a motor vehicle; determining a present specific embodiment of the motor vehicle; comparing the present specific embodiment with different predetermined specific embodiments of the object; selecting a predetermined specific embodiment that corresponds to the present specific embodiment; and determining the local area in which the vehicle is located on the basis of a local area that is associated with the selected specific embodiment.

The present invention is based on the finding that certain objects in different local areas are designed in a way that is different and characteristic in each case. For example, it may be concluded on the basis of the specific embodiment of a traffic sign in which country the motor vehicle is located. The local area of the motor vehicle may thereby be at least roughly or approximately determined. A position determination with the aid of another approach, for example, on the basis of a receiver for satellite navigation signals, may be replaced or improved as a result. Moreover, the result of the determination may be used for a plausibility check.

A traffic system applicable in the area of the motor vehicle is preferably determined on the basis of the local area. The traffic system may permit conclusions to be drawn about different requirements that are associated with the traffic region. If, for example, the traffic region includes Great Britain, then conclusions may be drawn about predetermined speed limits on different road classes and about left-hand traffic in general.

The motor vehicle may be controlled as a function of the determined traffic system. For example, a longitudinal control or lateral control of the motor vehicle may be controlled as a function of regularities or traffic rules that are associated with the traffic system.

The predetermined specific embodiments may be determined on the basis of legal definitions, the local area associated with a predetermined specific embodiment correlating with a scope of the corresponding legal definition.

The exact specific embodiment of an object, for example, a yield right of way sign, is usually not associated with a local area randomly or based on an observed statistical cumulation, but includes rules applicable for the local area, which also include a legal definition of the observed objects. For example, size, coloring and shape of the yield sign are each the same for different countries but are defined differently from one another. The legal scope of an ordinance, a regulation or other instruction, which establishes the exact specific embodiment of the yield sign may, as a good approximation, correspond to the local area in which the motor vehicle is located.

It is particularly preferred that a multitude of objects in the area of the motor vehicle is scanned and each associated with a local area, the local area in which the motor vehicle is located being determined on the basis of the determined local areas. In other words, it is preferred that the determination of the instantaneous local area of the motor vehicle is based not only on one object, but preferably on multiple objects. In this way, a false determination of the local area of the motor vehicle may be less likely. The determined local areas may be compared with one another according to an arbitrary known method, so that, for example, a majority decision takes place.

In one specific embodiment, the traffic system is associated with a national territory. In another specific embodiment, the traffic system is associated with a road class. For example, it may be concluded from a local sign on the roadside that the motor vehicle is not located on a freeway or rural road, but in the local area. In another example, it may be determined that the motor vehicle is located, for example, in a parking facility or in a "play street."

In one particularly preferred specific embodiment, the object includes an information sign. The information sign may be situated, in particular, in the area of a road on which the motor vehicle is located. The information sign may, for example, include a traffic sign, which may include, for example, a symbol, a hazard sign, a regulation sign, a directional sign, a traffic infrastructure, an additional sign or another sign not legally defined. Additional examples for the information sign may include a national coat of arms, the marking of a border crossing or a toll station. Even the official license plate number of the motor vehicle in the area of the host motor vehicle may be analyzed as a sign.

In another specific embodiment, the object includes a structural installation. The structural installation may be, in particular, in the area of a road on which the motor vehicle is located. Structural measures may include, for example, roadside development, a guard rail, a guidepost (road marker), vegetation, a particular structural feature, a curve radius, a road width or a roadbed. Such structural measures are each usually associated with a scope and therefore with a predetermined local area based on legal regulations.

A device includes a scanning device for scanning an object in the area of a motor vehicle, a memory that includes different predetermined specific embodiments of the object, each specific embodiment being associated with a local area, and a processing unit. The processing unit is configured to determine the specific embodiment of the scanned object, to compare the determined specific embodiment with stored specific embodiments, to select one of the stored specific embodiments that corresponds to the present specific embodiment, and to determine a local area in which the motor vehicle is located on the basis of a local area that is associated with the selected specific embodiment

BRIEF DESCRIPTION OF THE DRAWINGS

FIG. 3 shows different specific embodiments of a yield right of way sign.

FIG. 4 shows different specific embodiments of information signs.

FIG. 7 shows a flow chart of a method for the device of FIG. 1.

DETAILED DESCRIPTION

Figure 1:
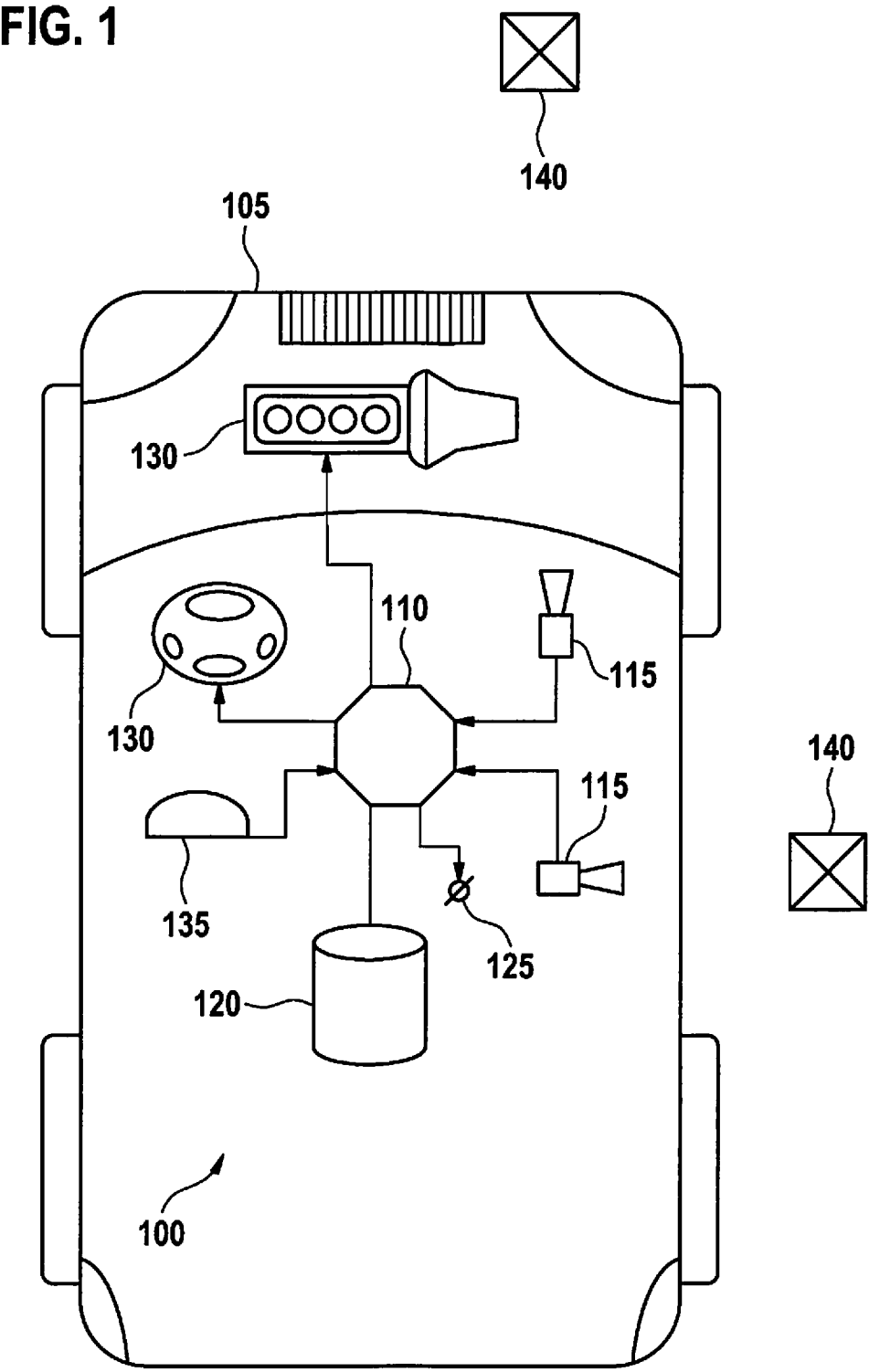
FIG. 1 shows schematically shows a representation of a device on board a motor vehicle.

FIG. 1 shows a device 100 on board a motor vehicle 105. Device 100 is configured to determine, at least approximately, a local area in which motor vehicle 105 is located on the basis of a scanning of surroundings of motor vehicle 105. In additional specific embodiments, device 100 may be configured to draw a conclusion about a traffic system applicable in the area of motor vehicle 105 on the basis of the local area and, if necessary to also control motor vehicle 105 as a function of the determined traffic system.

Device 100 includes a processing unit 110, at least one scanning unit 115, as well as a memory 120. An interface 125 for providing a determination result is optionally provided. Processing unit 110 may be connected to a control unit 130 of motor vehicle 105 for controlling motor vehicle 105. Depicted by way of example are a steering wheel as a symbol for a transverse control of motor vehicle 105 and a drive motor as a symbol for a longitudinal control of motor vehicle 105. In another specific embodiment, a position sensor 135 may be provided, which is connected to processing unit 110 and is configured to determine a position of motor vehicle 105 in a classic manner, for example, with the aid of a satellite navigation system. The determined position and the determined local area may be validated against one another or checked for plausibility, in order to enable an improved determination and control accuracy or control reliability of motor vehicle 105.

Located outside motor vehicle 105 is an object 140, which may be scanned with the aid of scanning unit 115. Scanning unit 115 may include a camera, a stereo camera, a video camera, a laser-guided distance sensor or a radar sensor. Multiple scanning units 115 may also be provided, whose detection ranges overlap or, as depicted, which may be disjunct from one another. In the illustrated specific embodiment, a first detection range is located in front of motor vehicle 105 and a second detection range is located to the side (laterally) of motor vehicle 105.

It is provided to scan object 140 in the area of motor vehicle 105 with the aid of scanning unit 115 and to determine a specific embodiment of object 140 with the aid of processing unit 110. Different specific embodiments of object 140 are stored in memory 120, each of which is associated with a predetermined local area. With the aid of a comparison of the determined specific embodiment with the stored specific embodiments, it may be concluded in which local area motor vehicle 105 is located.

Figure 2:
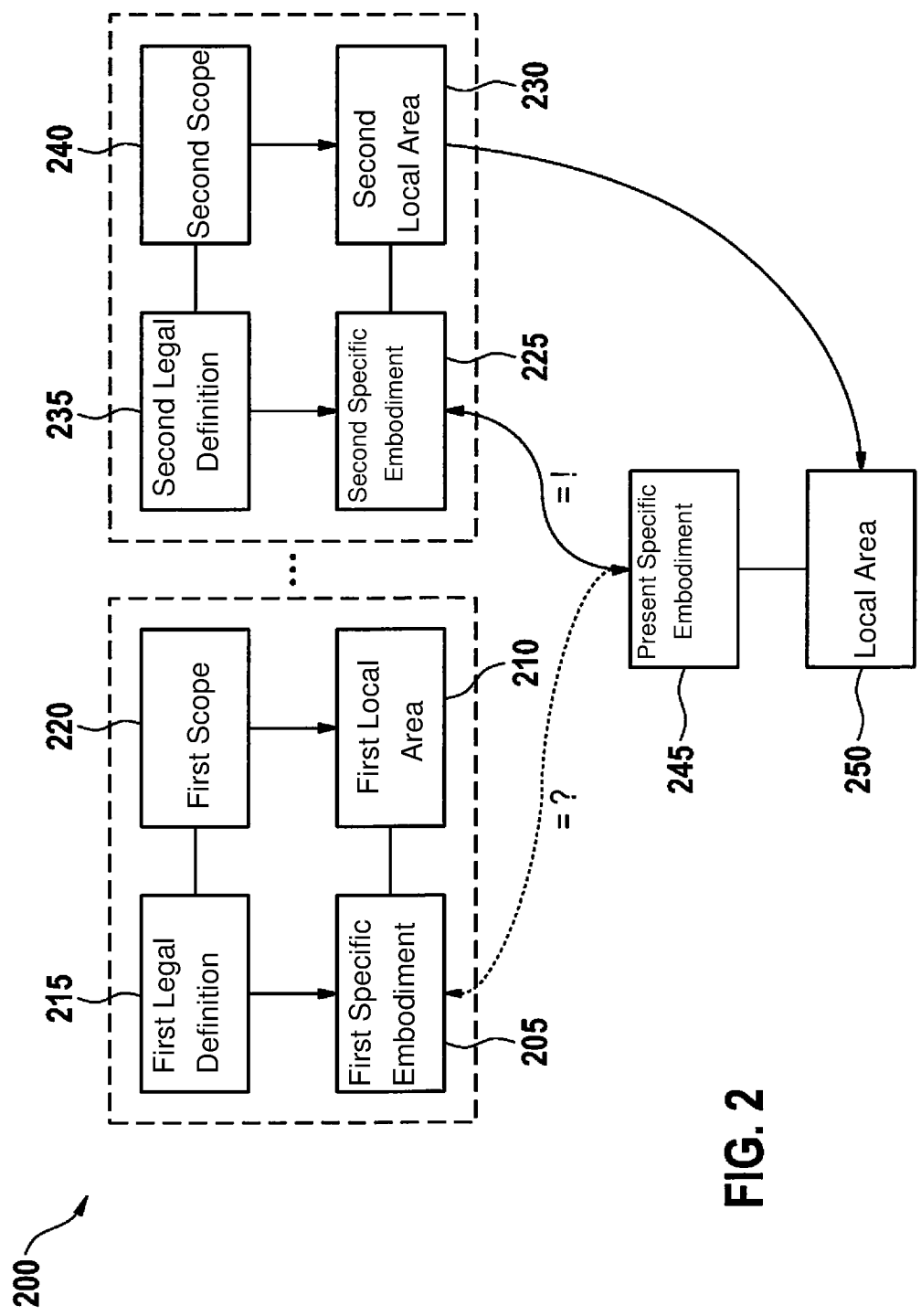
FIG. 2 shows the determination of a local area with the aid of the device of FIG. 1.

FIG. 2 shows the determination of a local area with the aid of device 100 of FIG. 1. A first specific embodiment 205 of object 140 of FIG. 1 is stored together with an associated first local area 210 in memory 120. In this case, first specific embodiment 140 and first local area 210 may be represented in arbitrary ways.

First specific embodiment 205 may be determined on the basis of a first legal definition 215, which is associated with a first scope 220. First legal definition 215 may, for example, include an ordinance or a law and define scannable aspects of object 140, for example, a visual appearance, a size, a coloring, a reflex behavior, an installation site relative to a lane of a road on which motor vehicle 105 is traveling, or a structural condition such as a junction, a turn, a bridge, etc. First scope 220 indicates where the first described specific embodiment 205 of object 140 is to be expected. Scope of validity 220 may include territorial boundaries of first legal definition 215 (for example, national boundaries) or a predetermined area (for example, in the area of a freeway or within a village or town). First specific embodiment 205 of object 140 may be indicated, for example, in its appearance on a cross-country road, so that first scope 220 relates to a cross-country road. This also usually specifies that it must be a cross-country road in a predetermined country, to which first legal definition 215 relates.

Correspondingly, a second specific embodiment 225, a second local area 230, a second legal definition 235 and a second scope 240 are provided. It should be noted that specific embodiments 205, 225 and local areas 210, 230 do not necessarily have to be defined on the basis of legal definitions 215, 235 and their scopes 220, 240.

One present specific embodiment 245 that has been scanned in the surroundings of motor vehicle 105 may be compared with stored specific embodiments 205, 225. If it is established that one of stored specific embodiments 205, 225, second specific embodiment 225 in the depiction of FIG. 2, corresponds to present specific embodiment 245, it may then be deduced that motor vehicle 105 is located in a local area 250 corresponding to second local area 230, with which second specific embodiment 225 is associated.

FIG. 3 shows different specific embodiments of an object 140 as exemplified by a yield sign. The specific embodiment of FIG. 3A corresponds to Germany, FIG. 3B corresponds to France, FIG. 3C corresponds to Great Britain, FIG. 3D corresponds to Poland and FIG. 3E corresponds to Sweden. Present local area 250 may be indicated in the selected example in each case with a country. Associated with this information are usually other requirements that relate to the control of motor vehicle 105, in particular, prohibitions and directives.

FIG. 4 shows different specific embodiments of object 140 of FIG. 1 as exemplified by information signs in Germany. Each of the information signs shown refers to a road classification that represents present local area 250 in which motor vehicle 105 is located. The information sign of FIG. 4A relates to the road class of a "play street," the information sign of FIG. 4B to a local area 210, the information sign of FIG. 4C to a highway, the information sign of FIG. 4D and the information sign of FIG. 4E each to a freeway and the information sign of FIG. 4F to a rural road. Present local area 250 determinable in such a way is associated in each case with a maximum speed of motor vehicle 105.

Figures 5A, 5B, 5C, 5D:
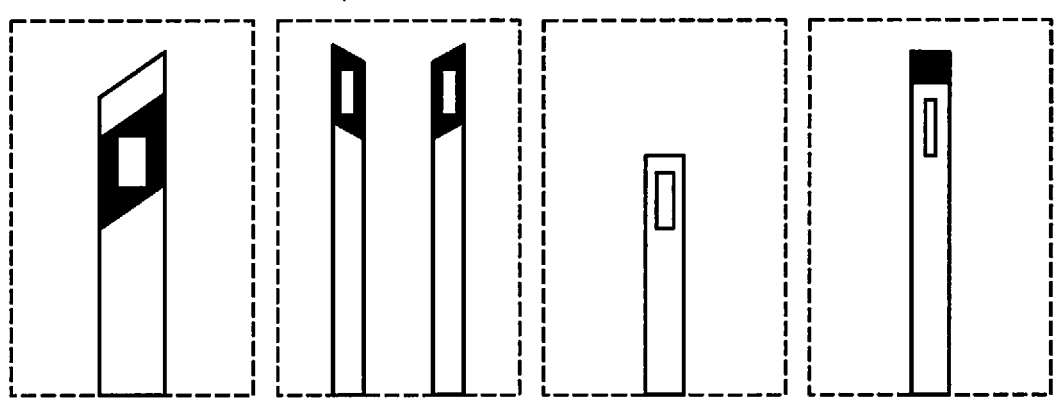
FIG. 5 shows different specific embodiments of road markers.
Figures 5E, 5F, 5G, 5H:
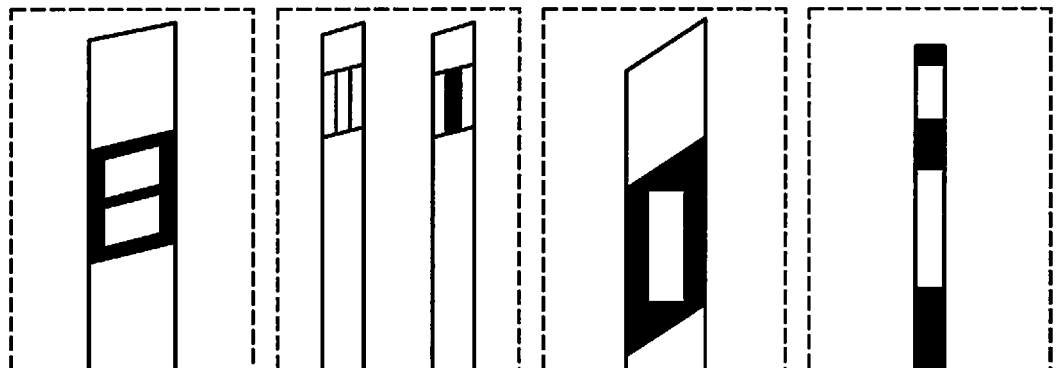
Figures 5I, 5J, 5K, 5L:
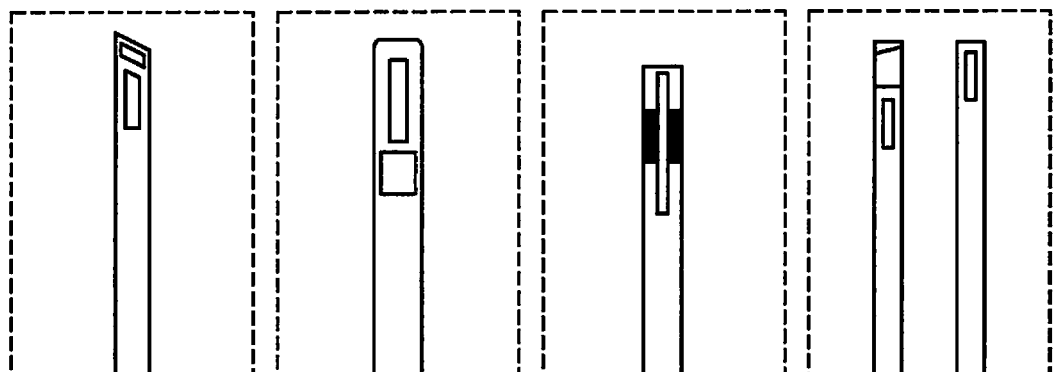

FIG. 5 shows different specific embodiments of an object 140 as exemplified by a road marker, as it may be used for delimiting a road or lane. The specific embodiments depicted in FIGS. 5A through 5L are each associated with one country, multiple designations being possible.

Figure 6:
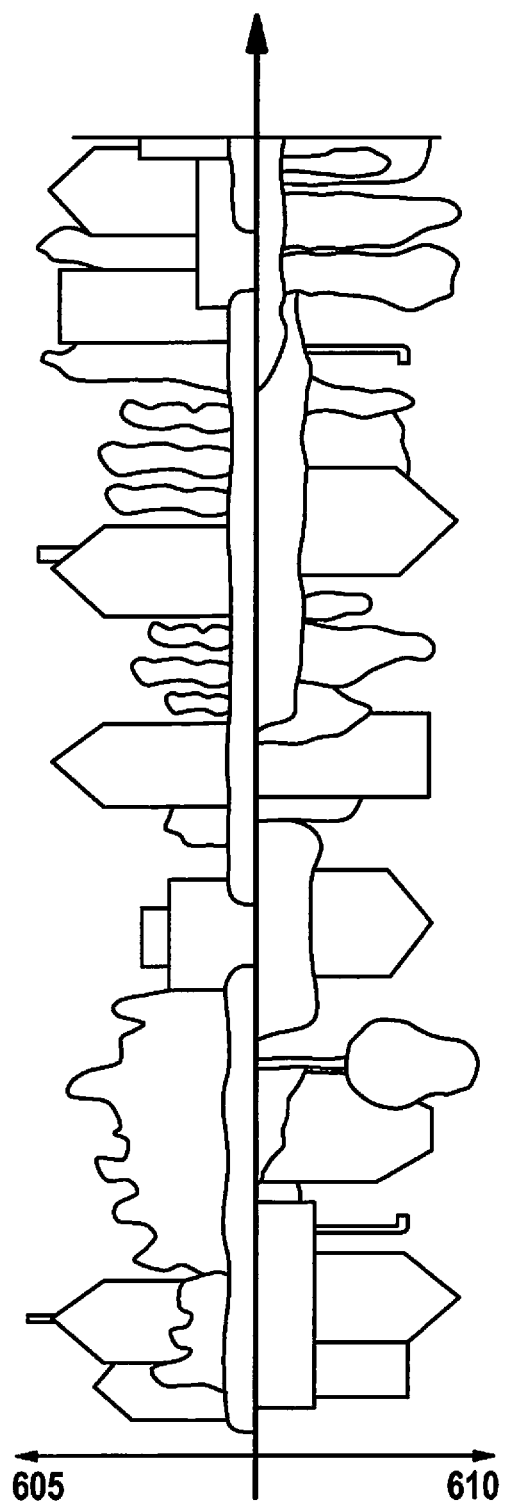
FIG. 6 shows exemplary lateral distance values to the motor vehicle of FIG. 1 on a road.

FIG. 6 shows exemplary lateral distance values to motor vehicle 105 of FIG. 1 on a road. Structural measures in the area of a road are usually regulated, for example, with the aid of a legal definition 215, 235. Thus, for example, a turn-off radius at a road intersection, a height or specific embodiment of a guard rail, a distance between road markers and a lane, an embankment distance or an embankment angle may each refer to a determined local area 210, 230. Multiple structural measures are preferably scanned and analyzed with the aid of device 100. This may be accomplished, for example, with the aid of a lateral distance measurement, the result of which is depicted in FIG. 6. A driving route of motor vehicle 105 is plotted in the vertical direction, and a distance 605 on the left side and a distance 610 on the right side are plotted in the horizontal direction. Based on the profiles of the distances over the path, it is possible to scan and further analyze topographic features or structural measures in the area of motor vehicle 105. The features determined may then be compared with information from memory 120 in order to determine present local area 250 of motor vehicle 105.

FIG. 7 shows a flow chart of a method 700 for device 100 of FIG. 1. Method 700 may run, in particular, on processing unit 110. In one specific embodiment, processing unit 110 is designed as a neuronal network, which also includes memory 120, the comparison of elements taking place in an integrated manner according to the rules of neuronal networks.

In a first step 705, the surroundings of motor vehicle 105 are scanned with the aid of scanning units 115. In an optional step 710, object 140 is recognized, this means, a positive comparison with stored characteristics of object 140 takes place. In this case, it is preferably established on the one hand what type of object 140 it is (for example, which traffic sign or which structural measure) and, at the same time, the specific embodiment 205, 225. If object 140 has been recognized, an interrupt may then be triggered in order to prompt processing unit 110 to further process recognized object 140.

In a step 715, the determined, present specific embodiment 245 is compared with a stored specific embodiment 205, 225. In a step 720, it is compared whether the specific embodiments match one another or correspond to one another. If this is not the case, method 700 then continues to carry out a comparison with the next stored specific embodiment 205, 225.

If it has been determined in step 720 that a specific embodiment 205, 225 has been found that matches determined present specific embodiment 245, then local area 210 associated with matching specific embodiment 205, 225 is preferably determined in a step 725. Local area 210 in this case may, for example, include a country, a road class, or some otherwise encircled geographical area. Determined local area 210 may be compared with a determined position of position sensor 135 in order to validate the position sensor or vice versa.

Optionally, a traffic system is determined in a step 730 on the basis of determined local area 210. The traffic system may include one or multiple legal requirements regarding the preferred control of motor vehicle 105.

Motor vehicle 105 may optionally also be controlled in a step 735 on the basis of the determined traffic system.

What is claimed is:

1. A method for locating a motor vehicle, the method comprising:
   scanning an object in an area of the motor vehicle;
   determining a present specific embodiment of the object;
   comparing the present specific embodiment of the object with different predetermined specific embodiments of the object;
   selecting one of the different predetermined specific embodiments, of the object, that corresponds to the present specific embodiment of the object; and
   determining a local area in which the motor vehicle is located on the basis of a local area associated with the selected specific embodiment of the object;
   wherein the object includes a traffic sign, a road sign, a road marker, a right-of-way sign, and/or a structural installation, wherein the object does not include physical markings on a surface of the road.

2. The method as recited in claim 1, further comprising:
   determining a traffic system applicable in the area of the motor vehicle on the basis of the local area.

3. The method as recited in claim 2, further comprising:
   controlling the motor vehicle as a function of the determined traffic system.

4. The method as recited in claim 2, wherein the traffic system is associated with a national territory.

5. The method as recited in claim 2, wherein the traffic system is associated with a road class.

6. The method as recited in claim 1, further comprising:
   determining the predetermined specific embodiments on the basis of a legal definition, wherein the local area is associated with a predetermined specific embodiment corresponding to a scope of the corresponding legal definition.

7. The method as recited in claim 1, further comprising:
   scanning a multitude of objects in the area of the motor vehicle, wherein each scanned object is associated with a local area, and wherein the local area in which the motor vehicle is located is determined on the basis of the determined local areas.

8. The method as recited in claim 1, wherein the object includes an information sign.

9. The method as recited in claim 1, wherein the object includes a structural installation.

10. The method of claim 1, wherein the determined local area is checkable for plausibility against a position from a navigation system.

11. A device for locating a motor vehicle, comprising:
   a scanning unit for scanning an object in an area of the motor vehicle;
   a memory including different predetermined specific embodiments of the object, wherein each specific embodiment is associated with a local area; and
   a processing unit configured to perform the following:
      determine a present specific embodiment of the object,
      compare the present specific embodiment of the object with different predetermined specific embodiments of the object, select one of the different predetermined specific embodiment that corresponds to the present specific embodiment of the object, and determine a local area in which the motor vehicle is located on the basis of a local area associated with the selected specific embodiment of the object;

wherein the object includes a traffic sign, a road sign, a road marker, a right-of-way sign, and/or a structural installation, wherein the object does not include physical markings on a surface of the road.

12. The device of claim 11, wherein the determined local area is checkable for plausibility against a position from a navigation system.

* * * * *